United States Patent
Udayamurthy et al.

(10) Patent No.: US 12,437,523 B2
(45) Date of Patent: Oct. 7, 2025

(54) ANOMALY DETECTION USING A CONVOLUTIONAL NEURAL NETWORK AND FEATURE BASED MEMORIES

(71) Applicant: JIDOKA TECHNOLOGIES PRIVATE LIMITED, Chennai (IN)

(72) Inventors: Sekar Udayamurthy, Chennai (IN); Mohan Nikam, Chennai (IN); Vinodh Venkatesh, Chennai (IN); Krishna Iyengar, Chennai (IN)

(73) Assignee: JIDOKA TECHNOLOGIES PRIVATE LIMITED, Chennai (IN)

( * ) Notice: Subject to any disclaimer, the term of this patent is extended or adjusted under 35 U.S.C. 154(b) by 169 days.

(21) Appl. No.: 18/035,942

(22) PCT Filed: Apr. 25, 2022

(86) PCT No.: PCT/IN2022/050385
§ 371 (c)(1),
(2) Date: May 9, 2023

(87) PCT Pub. No.: WO2022/229976
PCT Pub. Date: Nov. 3, 2022

(65) Prior Publication Data
US 2023/0410484 A1    Dec. 21, 2023

(30) Foreign Application Priority Data

Apr. 26, 2021 (IN) .............................. 202141019200

(51) Int. Cl.
*G06V 10/776* (2022.01)
*G06V 10/77* (2022.01)
(Continued)

(52) U.S. Cl.
CPC ........ *G06V 10/776* (2022.01); *G06V 10/7715* (2022.01); *G06V 10/774* (2022.01); *G06V 10/82* (2022.01)

(58) Field of Classification Search
CPC ............. G06V 10/776; G06V 10/7715; G06V 10/774; G06V 10/82; G06V 20/52;
(Continued)

(56) References Cited

U.S. PATENT DOCUMENTS

| | | | |
|---|---|---|---|
| 2019/0258225 A1* | 8/2019 | Link | G06T 7/70 |
| 2019/0362133 A1* | 11/2019 | Margolin | G06V 40/174 |
| 2020/0051017 A1* | 2/2020 | Dujmic | G06N 3/08 |

FOREIGN PATENT DOCUMENTS

| | | | | |
|---|---|---|---|---|
| CN | 108596865 A | | 9/2018 | |
| CN | 110849936 A | * | 2/2020 | ............. G01N 25/72 |
| CN | 112288676 A | * | 1/2021 | ............. G06V 10/25 |

OTHER PUBLICATIONS

Mahesh Sudhakar et. al., "Ada-SISE: Adaptive Semantic Input Sampling for Efficient Explanation of Convolutional Neural Networks" (Feb. 15, 2021) Feb. 15, 2021 [URL: https://arxiv.org/abs/2102.07799] Whole document especially fig 1.
(Continued)

*Primary Examiner* — Charlotte M Baker
(74) *Attorney, Agent, or Firm* — JCIP; Joseph G. Chu

(57) ABSTRACT

Embodiments of the present disclosure discuss a system and a method for anomaly detection in an object. Conventional systems of defect detection require labeled training data. Further, current anomaly detection systems cannot be easily incorporated into factory production systems. Embodiments of the present disclosure address this problem by using a convolutional neural network (CNN) and feature based memories such as neural network based memories for anomaly detection. The method described in the embodiments uses neural network based memories to generate
(Continued)

memory feature maps from feature maps extracted at intermediate layers of the CNN. Subsequently, heatmaps are created by calculating feature differences between the feature maps and the memory feature maps. Weighted averaging and post processing is performed on the heatmaps to identify the anomaly in the object.

18 Claims, 5 Drawing Sheets

(51) Int. Cl.
*G06V 10/774* (2022.01)
*G06V 10/82* (2022.01)

(58) Field of Classification Search
CPC .... G06N 3/094; G06N 3/0455; G06N 3/0464; G06N 3/0475; G06N 3/09
USPC ........................................................ 382/103
See application file for complete search history.

(56) References Cited

OTHER PUBLICATIONS

Jason Weston et. al., "Memory Networks" (Nov. 29, 2015) Nov. 29, 2015 [URL:https://arxiv.org/abs/1410.3916] whole document.
International Search Report and Written Opinion of International Searching Authority completed on Aug. 8, 2022 for International Application No. PCT/IN2022/050385.

* cited by examiner

ANOMALY DETECTION USING A CONVOLUTIONAL NEURAL NETWORK AND FEATURE BASED MEMORIES

FIELD OF INVENTION

The disclosure herein relates to a method, system, and a device for anomaly detection, and more particularly to anomaly detection in an object using a convolutional neural network (CNN) and feature based memories.

BACKGROUND

Traditional and age-old models of defect detection include humans with a trained eye looking for defects in objects including factory products, surfaces, or the like. Manual inspection is prone to error, repetitive, and is not feasible in this era when the number of products produced per minute in industries is high. Also, the current methods used for defect detection are unable to solve some complexities and challenges. In one example, the availability of labeled training data for defect detection is limited and substantial human effort is required to create training data for the machine learning algorithms used for defect detection. Further, as defects are object specific, context specific and sometimes unknown, the training data created to detect defects in one object may not provide satisfactory results for other objects. Hence this causes a multiplication of the human effort in creating labeled training data. Hence, there is a need to adopt anomaly detection systems and methods.

Anomaly detection is of interest in many research and application areas, especially in production processes where quality inspection is an integral part of the process. The evolution of computer vision and artificial intelligence—especially machine learning in the last decade has disrupted the means and methods used for anomaly detection. Recently, deep learning based methods for anomaly detection are being used for anomaly detection.

However, the adoption of anomaly detection is not straightforward. For example, incorporating business logic into anomaly detection systems is time consuming. Also, since anomalies are rare and diverse, the current anomaly detection systems incur high false positives. This results in a reduction in the efficiency of the anomaly detection systems. Hence, there is a need to overcome these complexities and provide efficient anomaly detection systems.

SUMMARY

Embodiments of the present disclosure present technological improvements as solutions to one or more of the above-mentioned technical problems.

For example, in one embodiment, a method for anomaly detection is provided. The method comprises receiving, by a processor, an image of an object; inputting, by the processor, the image to a pre-trained convolutional neural network including a plurality of intermediate layers; extracting, by the processor, feature maps output at the plurality of intermediate layers; inputting, by the processor, the feature maps extracted at the plurality of intermediate layers to pretrained neural network based memories corresponding to the plurality of intermediate layers to generate memory feature maps; creating, by the processor, a two-dimensional heatmap corresponding to each intermediate layer of the plurality of intermediate layers by calculating a feature difference between the feature map extracted at the intermediate layer and the memory feature map generated by the pretrained neural network based memory corresponding to the intermediate layer; resizing, by the processor, the two-dimensional heatmaps to the dimensions of the image; obtaining, by the processor, an anomaly heat map by performing a weighted average of the resized two-dimensional heatmaps; and identifying, by the processor, an anomaly in the object by discarding heatmap intensities below a threshold in the anomaly heatmap.

In another embodiment, a system for anomaly detection is provided. The system comprises a memory and at least one processor communicatively coupled to the memory, wherein the processor is configured to execute instructions stored in the memory to: receive an image of an object; input the image to a pre-trained convolutional neural network including a plurality of intermediate layers; extract feature maps output at the plurality of intermediate layers; input the feature maps extracted at the plurality of intermediate layers to pretrained neural network based memories corresponding to the plurality of intermediate layers to generate memory feature maps; create a two-dimensional heatmap corresponding to each intermediate layer of the plurality of intermediate layers by calculating a feature difference between the feature map extracted at the intermediate layer and the memory feature map generated by the pretrained neural network based memory corresponding to the intermediate layer; resize the two-dimensional heatmaps to the dimensions of the image; obtain an anomaly heat map by performing a weighted average of the resized two-dimensional heatmaps; and identify an anomaly in the object by discarding heatmap intensities below a threshold in the anomaly heatmap.

DETAILED DESCRIPTION OF EMBODIMENTS

Figure 1:
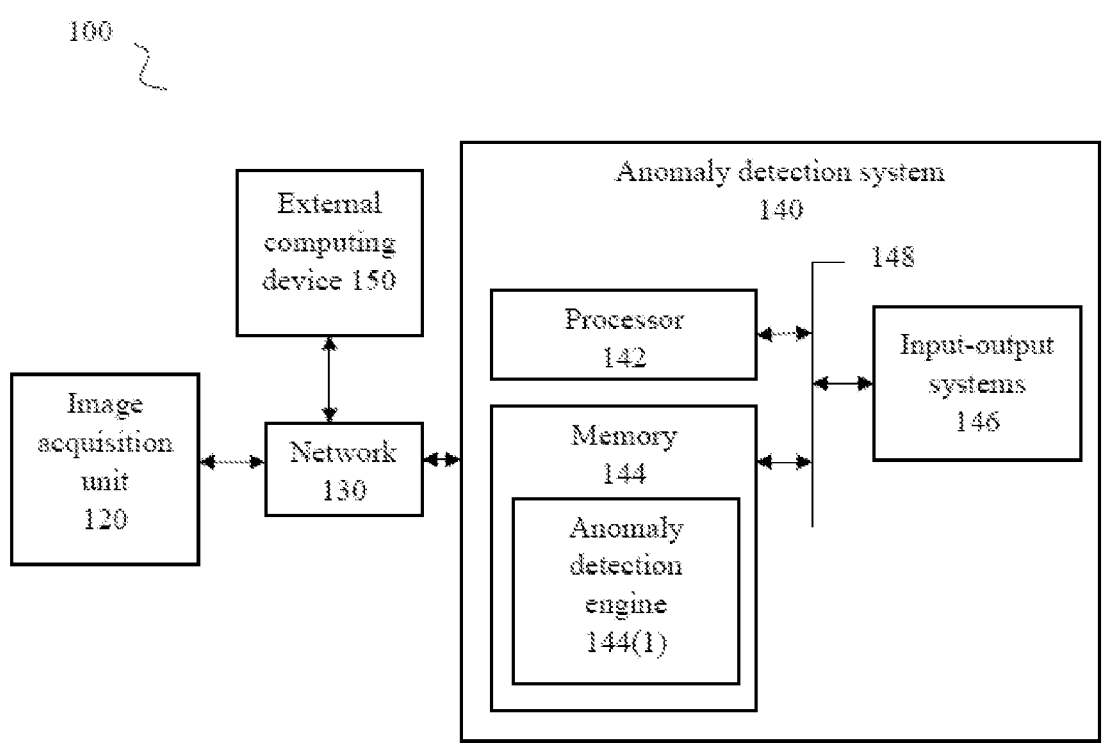
FIG. 1 illustrates a block diagram of an exemplary environment with an example of a system for anomaly detection.

A block diagram of an exemplary environment 100 with an example of a system for anomaly detection is illustrated in FIG. 1. The exemplary environment 100 includes an image acquisition unit 120, an anomaly detection system 140, and an external computing device 150 coupled together by a network 130, although the environment 100 can include other types or numbers of devices, components, elements, and communication networks in other topologies and deployments.

The image acquisition unit 120 may include at least one camera to acquire the images of objects placed in the field of view of the at least one camera. The image acquisition unit 120 may be configured to capture various images of the objects by rotating the objects in different axes. In embodiments, the image acquisition unit 120 may include a camera unit for capturing the images and a light unit for illuminating the object under test. The image acquisition unit 120 may include software or hardware to process the captured images of the object. The software or the instructions in the hardware may include artificial intelligence or machine learning algorithms providing intelligence to the image acquisition unit. Further, the image acquisition unit 120 may be capable of outputting the captured images, or processed images to external systems via the network 130.

The network 130 may include, or operate in conjunction with an adhoc network, an intranet, an extranet, internet, a virtual private network, a wired network such as a local area network (LAN), a wide area network (WAN), wireless networks such as wireless local area network (WLAN), WiFi®, Bluetooth®, cellular networks such as 5G, LTE, 4G, 3G, or a combination of two or more such networks.

The anomaly detection system 140 comprises of a processor 142, a memory 144, input-output systems 146, and a communication bus 148. The processor 142 may include any number of processing units that read data from the memory 144. The processor 142 is configured to fetch and execute computer-readable instructions stored in the memory. Specifically, the processor 142 is programmed to execute instructions to implement the embodiments of the disclosure. The processor 142 may also include an internal memory (not shown).

The memory 144 is used to store and provide access to instructions to implement the embodiments of the disclosure. The memory 144 specifically includes an anomaly detection engine 144(1) comprising instructions to the implement the embodiments of the disclosure. In embodiments, the memory 144 includes tangible, non-transitory computer readable medium known in the art including, for example, volatile memory such as static random access memory (SRAM), dynamic random access memory (DRAM), non-volatile memory such as read-only memory (ROM), erasable programmable ROM, flash memories, hard disks, optical disks, or magnetic tapes, removable memory, non-removable memory, or a combination thereof. The anomaly detection engine 144(1) may include code or instructions corresponding to machine learning algorithms, deep learning algorithms, convolutional neural networks, business logic, image processing, or the like, which may be used to implement the embodiments of the disclosure. The memory 144 may also include routines, programs, objects, components, data structures, or the like.

The input-output systems 146 may include input-output ports or other such hardware interfaces, systems, and their corresponding software, which enable the anomaly detection system 140 to communicate with external devices. In one example, the anomaly detection system 140 may use the input-output systems 146 to communicate with the image acquisition unit 120 or the external computing device 150 via the network 130. In one example, the input-output system 146 may include a network interface controller for Ethernet or a wireless adapter for WiFi®.

The communication bus 148 directly or indirectly couples the processor 142, the memory 144, and the input-output systems 146. The communication bus 148 may include one or more buses (such as an address bus, data bus, a control bus, or a combination thereof). The communication bus 148 may be a Video Electronics Standards Association Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a combination thereof.

In embodiments, the anomaly detection system 140 may be hardware such as an application specific integrated circuit (ASIC), a field programmable gate array (FPGA), a prototyping platform, a physical programmable circuit board, or the like. In other embodiments, the anomaly detection system 140 may be available as a cloud-based service. The anomaly detection system 140 may be offered as machine learning as a service (MLaaS). The anomaly detection system 140 may be hosted in a public cloud, a private cloud, or a hybrid cloud. The anomaly detection system 140 may also be accessed by external computing devices 150 using application programming interfaces (APIs).

The external computing device 150 may include a laptop, a desktop, a smartphone, a tablet, a wearable, or the like. There may be one or more such external computing devices 150 directly or communicatively coupled to the anomaly detection system 140 via the network 130. The external computing device 150 may include application programs such as a browser. The browser includes program modules and instructions enabling the external computing device 150 communicate with the anomaly detection system 140 using, by way of example, Hypertext transfer protocol (HTTP) messaging via the network 130. In one example, the external computing device 150 may communicate with the anomaly detection system 140 using APIs. The external computing device 150 may also communicate with the anomaly detection system 140 using other network protocols known in the art. The external computing device 150 may also include anomaly detection software which communicates with the anomaly detection system 140.

In embodiments, the anomaly detection system 140 may be a part of the external computing device 150. The anomaly detection engine 144(1) may be installed as a software in the external computing device 150. The anomaly detection engine 144(1) may also be installed as a hardware in the external computing device 150. In this example, the image acquisition unit 120 may provide the images of the objects to the external computing device 150 which uses the anomaly detection system 140, and more specifically the anomaly detection engine 144(1) to determine if the object includes an anomaly.

In embodiments, the anomaly detection system 140 may output instructions which may be used by the external computing device 150 to at least partially render a graphical user interface of an anomaly detection software installed in the external computing device 150. In another example, the anomaly detection software may be rendered in the browser of the external computing device 150. A user or a programmer may interact with the graphical user interface of the anomaly detection software. The graphical user interface may enable the user or the programmer to train the anomaly detection engine 144(1). More specifically, the graphical user interface may enable the user or the programmer to train machine learning, deep learning or artificial intelligence algorithms of the anomaly detection engine 144(1). The graphical user interface may also enable the user or the programmer to train convolutional neural networks (CNN), neural network based memories or other types of neural networks of the anomaly detection engine 144(1). The graphical user interface may also enable the user to provide input images to the anomaly detection engine 144(1) and receive a decision from the anomaly detection engine 144 (1).

In embodiments, the anomaly detection system 140 may be part of a computing device such as a desktop, a laptop, a smartphone, or the like. In this embodiment, a user may use a programming console or a graphical user interface of the computing device to train the convolutional neural network and the neural network based memories. The computing device may communicate with the image acquisition unit 120 via the network 130. Further, the computing device may receive images of the object from the image acquisition unit 120 and, based on the training provided to the convolutional neural network and the neural network based memories, determine an anomaly in the object. The determined anomaly in the object may be displayed as part of a heatmap in the computing device, as illustrated in image 496 of FIG. 4A. It may be understood that the black bordered box in the heatmap 496 is merely used for easy illustration and identification of the anomaly, and the actual heatmap output by the computing device may or may not include such illustrations.

The convolutional neural network (CNN) is a class of deep neural networks (DNN) which include a plurality of intermediate layers. The CNN may be trained using a dataset including images. The dataset may include a large corpus of images not limited to a specific object. The CNN may also be trained using images corresponding to the specific object. For example, if the goal of the anomaly detection system 140 is to detect anomaly in an automobile part, the CNN may be trained using images of the automobile part. The pretrained CNN may include the plurality of intermediate layers and based on the training, for an input image, the pretrained CNN outputs feature maps at each of the plurality of intermediate layers. In embodiments, the pretrained CNN may be an efficientnetB4, a ResNet50, or the like.

Figure 2:
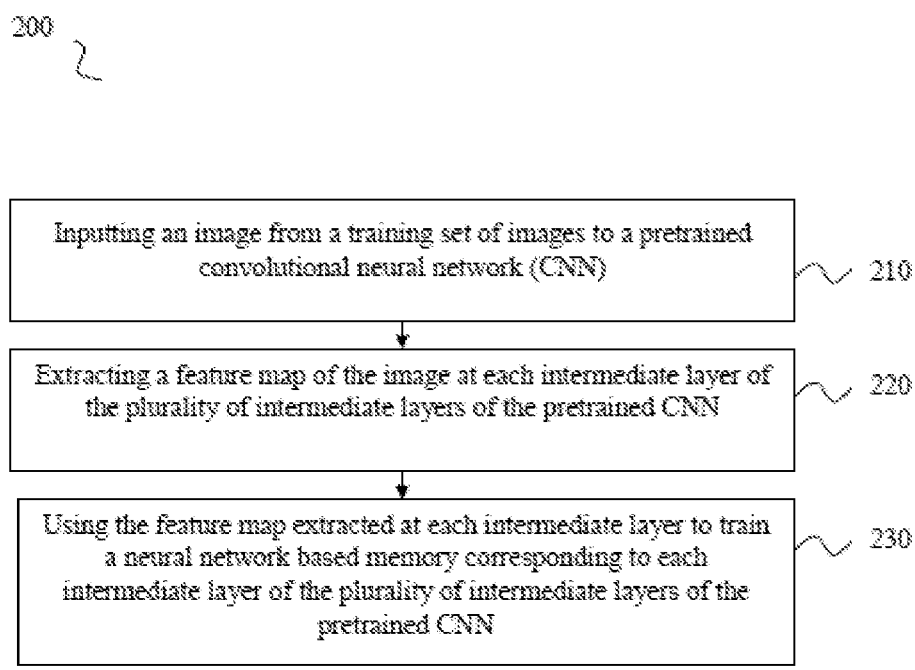
FIG. 2 illustrates an exemplary flow diagram of a processor implemented method for training a neural network based memory corresponding to each layer of a convolutional neural network.

FIG. 2 illustrates an exemplary flow diagram of a processor implemented method for training a neural network based memory corresponding to each layer of the pretrained convolutional neural network. The method 200 may be implemented by the anomaly detection system 140 of FIG. 1.

A training set of images may be determined for training the neural network based memory corresponding to each intermediate layer of the pretrained CNN. The training set may be determined manually or automatically. In one example, the training set of images may be a mixture of images of objects which are anomalous, non-anomalous, or both. Each image of the training set may be input to the anomaly detection system 140. In one example, a user accessing the external computing device 150 may input the images of the training set in the external computing device 150 which transmits the images to the anomaly detection system 140 via the network 130. In another example, the user may input the images of the training set to the anomaly detection system 140 from an input-output device (not shown) coupled to the anomaly detection system 140. The input-output device may, by way of example, be a monitor, a mouse, keyboard, touchpad, stylus, or a combination thereof.

The processor 142 is configured to receive the images of the training set. At step 210, the processor 142 is configured to input the image from the training set of images to the pretrained CNN. At step 220, the processor 142 is configured to extract a feature map of the image at each intermediate layer of the plurality of intermediate layers of the pretrained CNN. At step 230, the processor 142 is configured to use the feature map extracted at each intermediate layer to train a neural network based memory corresponding to each intermediate layer of the plurality of intermediate layers of the pretrained CNN. The processor 142 may implement the steps of the method 200 for each image of the training set. The neural network based memory may be a feature based memory.

For further illustration, in embodiments, the pretrained CNN may include four intermediate layers. For an input image of size 32×32, the feature maps output at each of the four intermediate layers may be of the size 18×18, 10×10, 6×6, 4×4 respectively. The first feature map of the size 18×18, output from the first intermediate layer may be used to train the neural network based memory corresponding to the first intermediate layer. Similarly, the second feature map of the size 10×10, output from the second intermediate layer may be used to train the neural network based memory corresponding to the second intermediate layer. The third feature map of the size 6×6 output from the third intermediate layer may be used to train the neural network based memory corresponding to the third intermediate layer. The fourth feature map of the size 4×4 output from the fourth intermediate layer may be used to train the neural network based memory corresponding to the fourth intermediate layer. In this way, for each image input to the pretrained CNN, the plurality of intermediate layers of the pretrained CNN output feature maps which are used to train the neural network based memories corresponding to the plurality of intermediate layers.

The neural network based memories automatically learn the patterns of the input feature maps generated from non-anomalous images. Subsequent to the training, for an input feature map, the neural network based memory corresponding to an intermediate layer generates an output feature map identical to the feature maps of the images provided by the intermediate layer to the neural network based memory during training. The neural network based memory can be used to generate new images which are similar to images used for training the neural network based memory. For example, the neural network based memory trained on images of cars can generate new car images that look authentic to human observers. The neural network based memory may produce a lossy output, with an objective to minimize the difference of the input and output, for the features extracted for the training images. The neural network based memory corresponding to each intermediate layer may be a generative adversarial network (GAN), an auto-encoder, or the like.

The training set of images may or may not have annotations. In one example, an identified anomaly of an object be determined as a minor anomaly and the business logic may determine that the minor anomaly is acceptable. The image of the object in which the anomaly is identified may be annotated as acceptable or non-anomalous.

Figure 3:
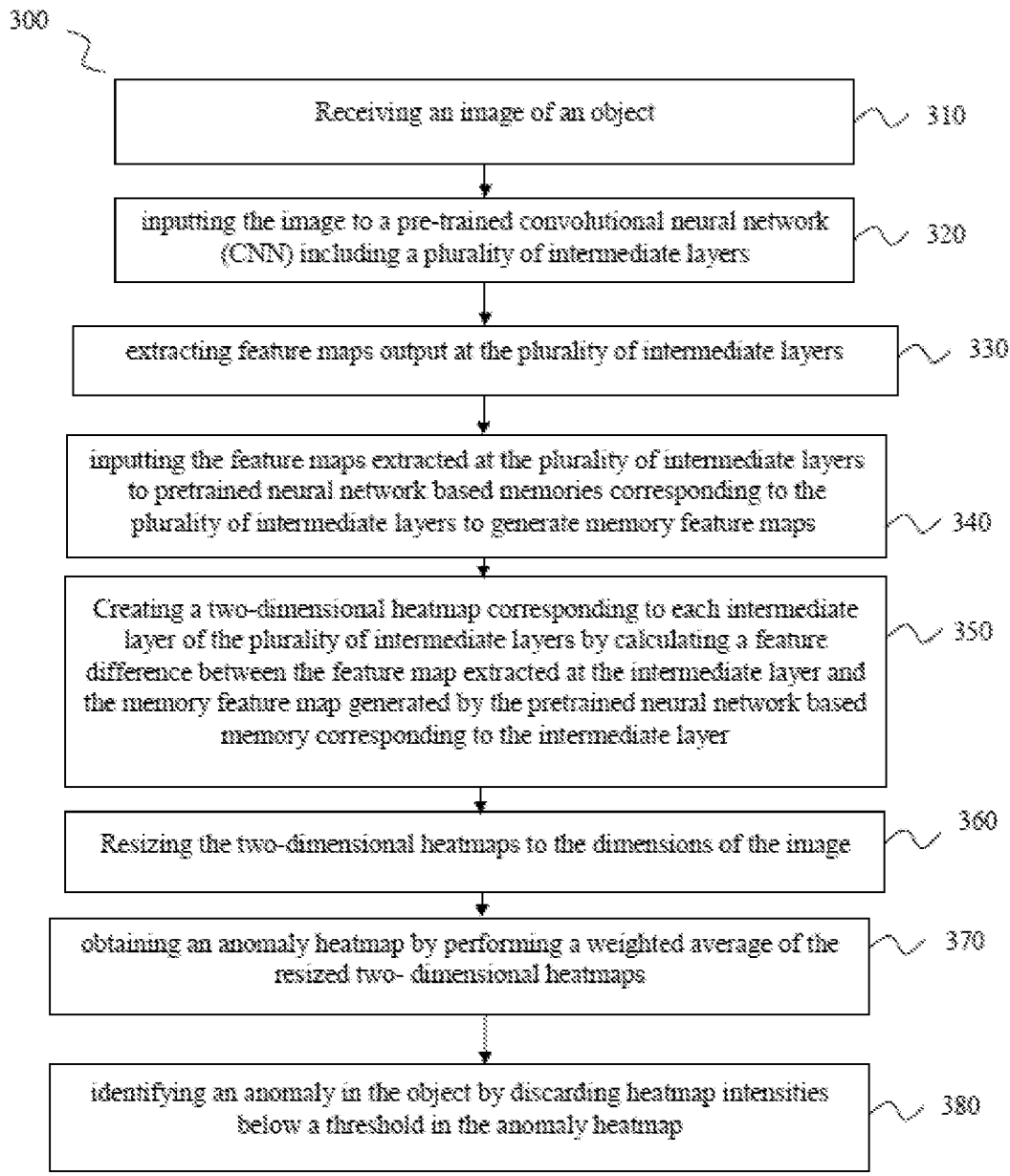
FIG. 3 illustrates an exemplary flow diagram of a processor implemented method for detecting an anomaly in an object.

FIG. 3 illustrates an exemplary block diagram of a processor implemented method 300 for detecting an anomaly in the object. The steps of the method 300 may be performed by the system 100 of FIG. 1. At step 310, the processor 142 is configured to receive the image of the object. The image acquisition unit 120 captures an image of the object and transmits the captured image to the anomaly detection system 140 via the network 130. The processor 142 is configured to receive the image of the object transmitted by the image acquisition unit 120. In embodiments, the image acquisition unit 120 may capture multiple images of the object and send the captured images to the anomaly detection system 140 via the network 130.

At step 320, the processor 142 is configured to input the image to the pretrained CNN including a plurality of intermediate layers. The pretrained CNN performs convolutions on the input image and outputs a first feature map at each intermediate layer of the plurality of intermediate layers of the pretrained CNN. The number of intermediate layers of the pretrained CNN may be determined based on business logic and the object in which the anomaly is to be detected. For example, the number of intermediate layers of the pretrained CNN used to detect anomalies in an automotive part and drill bit may be different.

At step 330, the processor 142 is configured to extract feature maps output at the plurality of intermediate layers of the pretrained CNN. Each intermediate layer of the plurality of intermediate layers may include a filter which is convolved with the input image to extract feature maps. The feature maps may be generated by applying the filter across the input image to the pretrained CNN. In one example, a first feature map may be output by the first intermediate layer of the pretrained CNN and a second feature map may be output by the second intermediate layer of the pretrained CNN, and so on. By using plurality of intermediate layers—edges, features, and models of the input image can be extracted. The parameters of the filters of the pretrained CNN may be determined when training the CNN.

At step 340, the processor 142 is configured to input the feature maps extracted at the plurality of intermediate layers to pretrained neural network based memories corresponding to the plurality of intermediate layers to generate memory feature maps. For example, the first feature map extracted from the first intermediate layer of the pretrained CNN may be input to a neural network memory corresponding to the first intermediate layer of the pretrained CNN to generate a first memory feature map. The second feature map extracted from the second intermediate layer of the pretrained CNN may be input to a neural network memory corresponding to the second intermediate layer of the pretrained CNN to generate a second memory feature map. The pretrained neural network based memories may generate the memory feature maps from the feature maps based on the training provided to the neural network based memories. The pretrained neural network based memories corresponding to each intermediate layer may be a generative adversarial network (GAN), an auto-encoder, or the like.

At step 350, the processor 142 is configured to create a two-dimensional heatmap corresponding to each intermediate layer of the plurality of intermediate layers, by calculating feature difference between the feature map extracted at the intermediate layer and the memory feature map generated by the pretrained neural network based memory corresponding to the intermediate layer. For example, a first two dimensional heatmap is created by calculating a feature difference between the first feature map and the first memory feature map. A second two dimensional heatmap is created by calculating the feature difference between the second feature map and the second memory feature map. At step 360, the processor 142 is configured to resize the two-dimensional heatmaps, created corresponding to the plurality of intermediate layers, to the dimensions of the image input to the pretrained CNN.

At step 370, the processor 142 is configured to obtain an anomaly heatmap by performing a weighted average of the resized two-dimensional heatmaps corresponding to each layer of the plurality of intermediate layers. Each resized two-dimensional heatmap is multiplied with a weight and the resultant two-dimensional heatmaps are added with each other to determine the weighted average. The value of each weight may be chosen automatically or manually based on the importance of each two-dimensional heatmap in detecting the anomaly.

At step 380, the processor 142 is configured to identify an anomaly in the object by discarding heatmap intensities below a threshold in the anomaly heatmap. In one example, the producers or the end users of the objects may accept certain minor anomalies if the minor anomalies do not affect the function of the object. The threshold for minor anomalies may be determined based on business logic which defines certain anomalies as acceptable and some other anomalies as not acceptable. The method 300 incorporates business logic into anomaly detection by using a combination of neural network based memories, weighted averaging and thresholding to discard heatmap intensities. This reduces the time required to incorporate business logic into anomaly detection and improves the efficiency of the anomaly detection system 140.

In one example, the image is classified as anomalous or non-anomalous based on the identification of the anomaly in the object. If an anomaly is identified, the image or the object in the image, may be classified as anomalous and if an anomaly is not identified, the image or the object in the image may be classified as non-anomalous. In embodiments, the processor 142 may fetch and execute the instructions corresponding to the anomaly detection engine 144(1) to perform the steps of the method 300.

Figure 4:
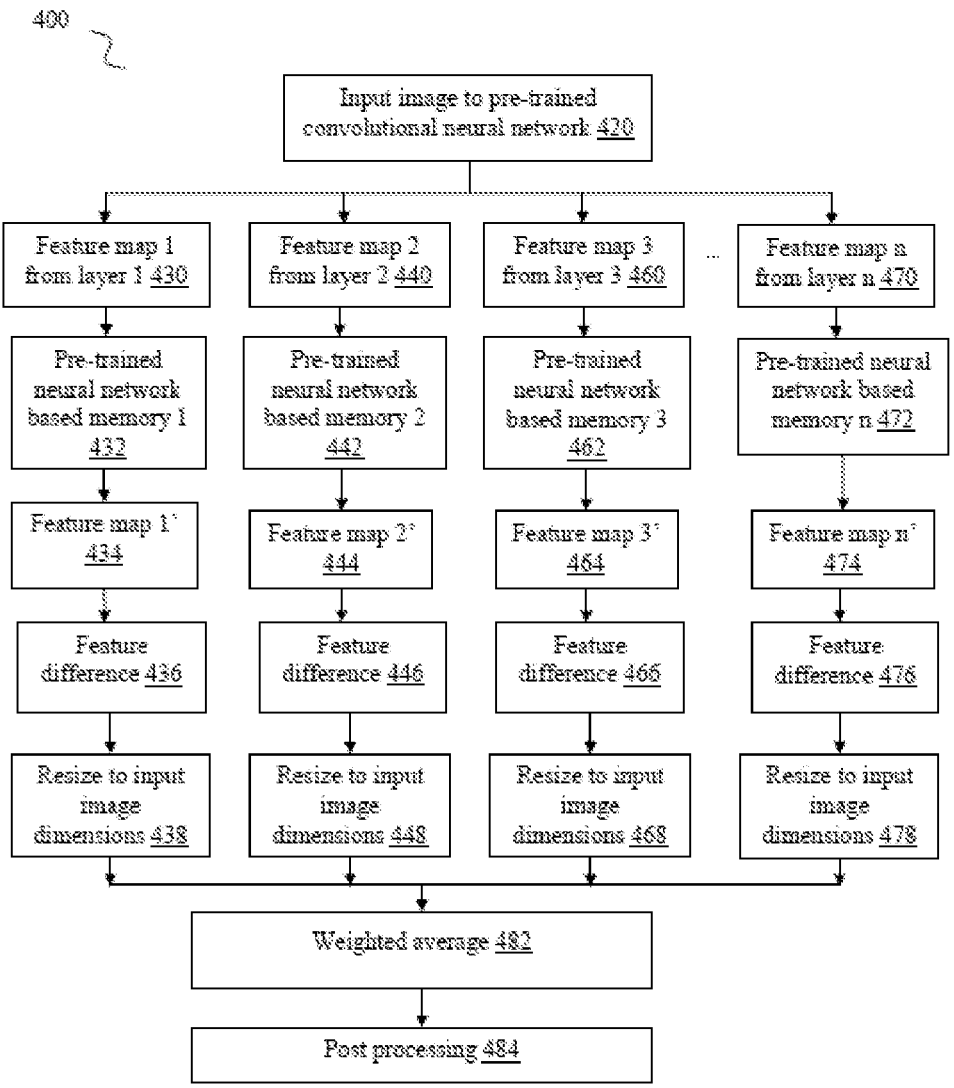
FIG. 4 illustrates an exemplary block diagram for detecting the anomaly in the object.

FIG. 4 is an exemplary flow diagram 400 which illustrates inputs, outputs, and methods at various stages of anomaly detection using the method 300 described above. In embodiments, the processor 142 may fetch and execute the instructions corresponding to the anomaly detection engine 144(1) to perform the steps of the flow diagram 400. The image acquisition unit 120 may capture an image of the object and transmit the captured image to the anomaly detection system 140 via the network 130. The anomaly detection system 140 may receive the image and at step 420, the image is input to the pretrained convolutional neural network (CNN). The pretrained CNN performs convolutions on the input image and outputs feature maps at each intermediate layer of the plurality of intermediate layers of the pretrained CNN. In this example, the pretrained CNN may include n intermediate layers and the operations performed by the anomaly detection system 140 based on the feature map output at each of the n intermediate layers may be similar. For example, the steps 430, 432, 434, 436, and 438 correspond to operations performed based on the feature map output at intermediate layer 1 of the pretrained CNN. At step 430, 440, 460, and 470 the feature map 1, feature map 2, feature map 3, and feature map n are extracted from intermediate layer 1, intermediate layer 2, intermediate layer 3, and intermediate layer n of the pretrained CNN respectively.

At step 432, 442, 462, and 472, the feature map 1, feature map 2, feature map 3, and feature map n are input to pre-trained neural network based memory 1, pre-trained neural network based memory 2, pre-trained neural network based memory 3, and pre-trained neural network based memory n respectively. At steps 434, 444, 464, and 474, the pre-trained neural network based memory 1, pre-trained neural network based memory 2, pre-trained neural network based memory 3, and pre-trained neural network based memory n generate: feature map 1', feature map 2', feature map 3', and feature map n' based on the inputs: feature map 1, feature map 2, feature map 3, and feature map n respectively. The feature map 1', feature map 2', feature map 3', and feature map n' may be memory feature maps. At steps 436, 446, 466 and 476, feature difference is calculated between the feature map 1' and feature map 1, feature map 2' and feature map 2, feature map 3' and feature map 3, feature map n' and feature map n resulting in the creation of the two-dimensional heatmaps: heatmap 1, heatmap 2, heatmap 3, and heatmap n respectively. At steps 438, 448, 468, and 478 the heatmap 1, heatmap 2, heatmap 3, and heatmap n are resized to the dimensions of the input image. At step 482, a weighted average of the resized heatmaps obtained at steps 438, 448, 468, and 478 is performed to obtain an anomaly heatmap. The weights in the weighted average may be determined based on the type of the anomaly to be detected. At step 484, post processing is performed on the anomaly heatmap by discarding heatmap intensities below a threshold. The threshold may be automatically determined based on the type of the anomaly. In embodiments, the threshold may be manually determined.

Figure 4A:
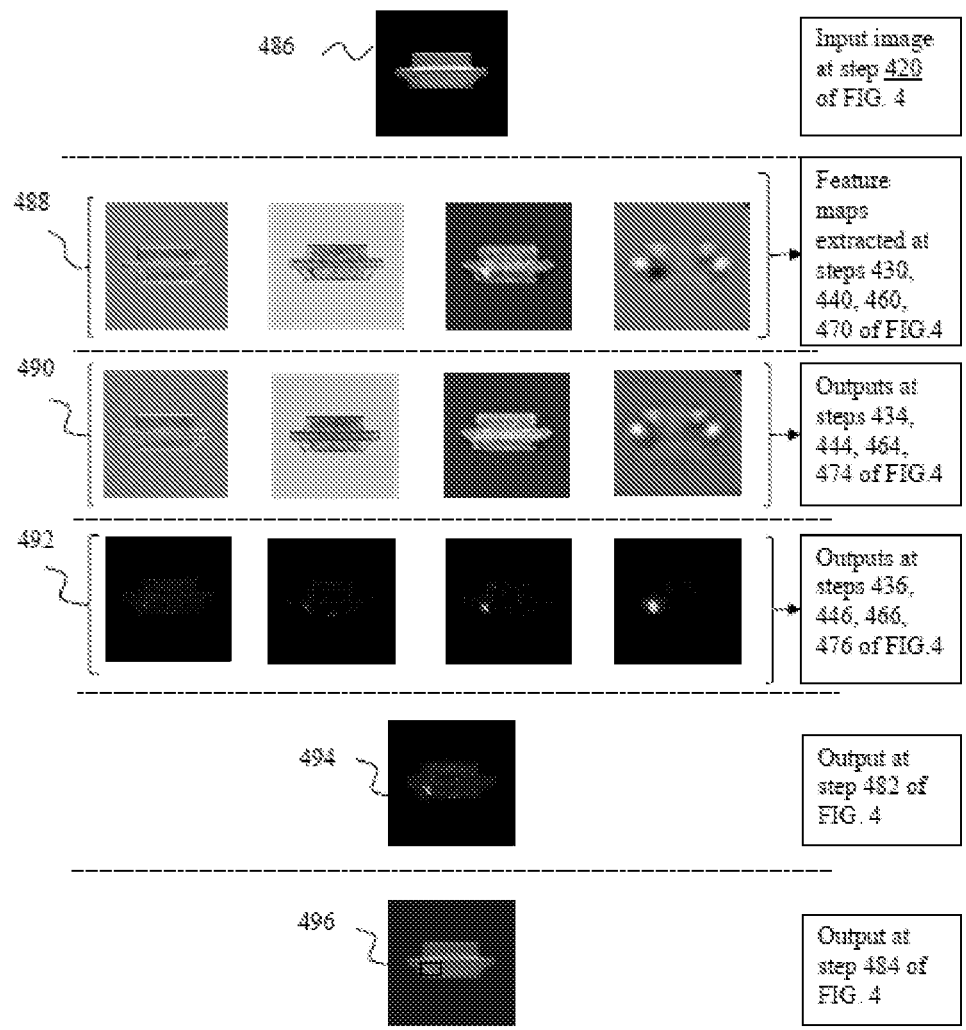
FIG. 4A illustrates exemplary input to the blocks illustrated in FIG. 4 and outputs from the blocks illustrated in FIG. 4.

FIG. 4A illustrates exemplary inputs to the steps illustrated in FIG. 4 and outputs from the steps illustrated in FIG. 4. In one example, the pretrained CNN may include four intermediate layers (n=4 in FIG. 4). The image 486 is an input image at step 420 of FIG. 4. The feature maps 488 may be the feature maps extracted at 430, 440, 460, and 470 of FIG. 4. The memory feature maps 490 may be the memory feature maps generated by the pretrained neural network based memories at steps 434, 444, 464, and 474. The two-dimensional heatmaps 492 may be the outputs of steps 436, 446, 466, and 476 of FIG. 4. The anomaly heatmap 494 may be the output of step 482 of FIG. 4, obtained by performing the weighted average of the resized two-dimensional heatmaps corresponding to each layer of the plurality of layers. The second anomaly heatmap 496 may be created by discarding heatmap intensities below a threshold from the anomaly heatmap 494. Based on the second anomaly heatmap, the anomaly detection system 140 may determine if the object has an anomaly. Based on the determination, the anomaly detection system 140 may classify the object as anomalous or non-anomalous.

As the anomaly detection system 140 is multiscale and uses neural network based memory modules, the anomaly detection system 140 needs minimum training data. In one example, the training set may include 30-100 images of the object. The anomaly detection system 140 also significantly reduces the human effort in determining the anomalies in the object. Further, as the anomaly detection system 140 needs less training, the anomaly detection system 140 requires fewer processor cycles and lesser memory capabilities to detect anomalies.

Some implementations may include a non-transitory computer readable storage medium storing instructions executable by a processor 142 to perform the methods described above. Yet another implementation may include a system including memory and one or more processors 142 operable to execute instructions, stored in the memory, to perform the methods described above. Computer readable media (CRM) implementations of the technology disclosed include a non-transitory computer readable storage medium comprising computer program instructions, when executed by a processor 142, implement the methods described above.

Having described the aspects of the embodiments in detail, it will be apparent that modifications are possible without departing from the scope of the embodiments as defined in the appended claims. It should also be understood that there is no intention to limit the disclosure to the specific embodiments disclosed, but on the contrary, the intention is to cover modifications, alternative constructions, and equivalents falling within the spirit and scope of the disclosure.

We claim:

1. A method for anomaly detection comprising:
receiving, by a processor, an image of an object (310);
inputting, by the processor, the image to a pre-trained convolutional neural network including a plurality of intermediate layers (320);
extracting, by the processor, feature maps output at the plurality of intermediate layers (330);
inputting, by the processor, the feature maps extracted at the plurality of intermediate layers to pretrained neural network based memories corresponding to the plurality of intermediate layers to generate memory feature maps (340);
creating, by the processor, a two-dimensional heatmap corresponding to each intermediate layer of the plurality of intermediate layers by calculating a feature difference between the feature map extracted at the intermediate layer and the memory feature map generated by the pretrained neural network based memory corresponding to the intermediate layer (350);
resizing, by the processor, the two-dimensional heatmaps to the dimensions of the image (360);
obtaining, by the processor, an anomaly heat map by performing a weighted average of the resized two-dimensional heatmaps (370); and
identifying, by the processor, an anomaly in the object by discarding heatmap intensities below a threshold in the anomaly heatmap (380).

2. The method as claimed in claim 1, wherein the image is received from an image acquisition unit (120).

3. The method as claimed in claim 2, wherein the image acquisition unit (120) comprises a plurality of cameras.

4. The method as claimed in claim 1, wherein the pretrained neural network based memories include an autoencoder.

5. The method as claimed in claim 1, wherein the pretrained neural network based memories includes a generative adversarial network.

6. The method as claimed in claim 1, wherein the threshold is calculated using a business logic.

7. The method as claimed in claim 1, wherein the pretrained neural network based memory corresponding to each intermediate layer is trained using feature maps extracted at the layer when images of a training set are input to the pretrained convolutional neural network.

8. The method as claimed in claim 1, comprising classifying the image based on the identified anomaly.

9. The method as claimed in claim 1, wherein the object is classified as anomalous based on the identified anomaly.

10. A system (100) for anomaly detection comprising:
a memory (144); and
at least one processor (142) communicatively coupled to the memory (144), wherein the at least one processor (142) is configured to execute instructions stored in the memory to:
receive an image of an object (310);
input the image to a pre-trained convolutional neural network including a plurality of intermediate layers (320);
extract feature maps output at the plurality of intermediate layers (330);
input the feature maps extracted at the plurality of intermediate layers to pretrained neural network based memories corresponding to the plurality of intermediate layers to generate memory feature maps (340);
create a two-dimensional heatmap corresponding to each intermediate layer of the plurality of intermediate layers by calculating a feature difference between the feature map extracted at the intermediate layer and the memory feature map generated by the pretrained neural network based memory corresponding to the intermediate layer (350);

resize the two-dimensional heatmaps to the dimensions of the image (360);

obtain an anomaly heat map by performing a weighted average of the resized two-dimensional heatmaps (370); and identify an anomaly in the object by discarding heatmap intensities below a threshold in the anomaly heatmap (380).

11. The system as claimed in claim 10, wherein the image is received from an image acquisition unit (120).

12. The system as claimed in claim 11, wherein the image acquisition unit (120) comprises a plurality of cameras.

13. The system as claimed in claim 10, wherein the pretrained neural network based memories include an autoencoder.

14. The system as claimed in claim 10, wherein the pretrained neural network based memories include a generative adversarial network.

15. The system as claimed in claim 10, wherein the threshold is calculated using a business logic.

16. The system as claimed in claim 10, wherein the pretrained neural network based memory corresponding to each intermediate layer is trained using feature maps extracted at the layer when images of a training set are input to the pretrained convolutional neural network.

17. The system as claimed in claim 10, comprising classifying the image based on the identified anomaly.

18. The system as claimed in claim 10, wherein the object is classified as anomalous based on the identified anomaly.

* * * * *